US010663754B2

(12) United States Patent
Minamisawa (10) Patent No.: US 10,663,754 B2
(45) Date of Patent: May 26, 2020

(54) OPTICAL UNIT WITH SHAKE CORRECTION FUNCTION STRUCTURED TO SWING OPTICAL ELEMENT

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 143 days.

(21) Appl. No.: 15/972,236

(22) Filed: May 7, 2018

(65) Prior Publication Data
US 2018/0321505 A1    Nov. 8, 2018

(30) Foreign Application Priority Data

May 8, 2017   (JP) ................................. 2017-092235

(51) Int. Cl.
G02B 27/64     (2006.01)
H04N 5/225     (2006.01)
H04N 5/232     (2006.01)

(52) U.S. Cl.
CPC ......... G02B 27/646 (2013.01); H04N 5/2254 (2013.01); H04N 5/23264 (2013.01);
(Continued)

(58) Field of Classification Search
CPC .. G02B 27/64; G02B 27/646; H04N 5/23248; H04N 5/23264; H04N 5/2328; H04N 5/23287
(Continued)

(56) References Cited

U.S. PATENT DOCUMENTS 9,386,226 B2 *   7/2016   Takizawa ................. G03B 5/00
9,891,444 B2 *   2/2018   Minamisawa ........... G03B 5/00
(Continued)

FOREIGN PATENT DOCUMENTS

CN        102282510       12/2011
JP        2015064501      4/2015
(Continued)

OTHER PUBLICATIONS

"Office Action of Taiwan Counterpart Application", dated Sep. 20, 2018, p. 1-p. 3.

Primary Examiner — Arnel C Lavarias
(74) Attorney, Agent, or Firm — JCIPRNET (57) ABSTRACT

An optical unit with a shake correction function include a movable body having an optical element, a swing support mechanism swingably supporting the movable body between a reference posture and a tilted posture, a fixed body supporting the movable body through the swing support mechanism, a magnetic swing drive mechanism structured to swing the movable body, and a posture return mechanism structured to return the movable body to the reference posture. The magnetic swing drive mechanism includes a coil and a magnet, the magnet is polarized and magnetized to have different magnetic poles in an axial line direction, the posture return mechanism includes the magnet and a magnetic member attached to a side to which the coil is fixed, and a center of the magnetic member is overlapped with a magnetizing polarized line of the magnet when the movable body in the reference posture is viewed in a radial direction.

20 Claims, 9 Drawing Sheets

(52) U.S. Cl.
   CPC . *H04N 5/23287* (2013.01); *G03B 2205/0023* (2013.01); *G03B 2205/0069* (2013.01)

(58) Field of Classification Search
   USPC ....... 359/554, 557; 250/201.1, 201.2, 201.4; 348/208.99, 208.2, 208.12; 396/52, 55
   See application file for complete search history.

(56) References Cited

U.S. PATENT DOCUMENTS

| | | | |
|---|---|---|---|
| 10,191,297 B2* | 1/2019 | Yanagisawa | ......... G02B 27/646 |
| 10,389,941 B2* | 8/2019 | Minamisawa | ....... H04N 5/2253 |
| 2015/0160407 A1 | 6/2015 | Hsiao et al. | |
| 2015/0195459 A1 | 7/2015 | Yeo | |
| 2018/0129065 A1* | 5/2018 | Minamisawa | ........... G02B 7/04 |

FOREIGN PATENT DOCUMENTS

| | | |
|---|---|---|
| TW | 201215911 | 4/2012 |
| WO | 2014207298 | 12/2014 |

\* cited by examiner

OPTICAL UNIT WITH SHAKE CORRECTION FUNCTION STRUCTURED TO SWING OPTICAL ELEMENT

CROSS REFERENCE TO RELATED APPLICATION

The disclosure claims priority under 35 U.S.C. § 119 to Japanese Application No. 2017-092235 filed May 8, 2017, the entire content of which is incorporated herein by reference.

FIELD OF THE DISCLOSURE

At least an embodiment of the disclosure may relate to an optical unit with a shake correction function which is mounted on a portable terminal or a movement body.

BACKGROUND

An optical unit which is mounted on a movement body such as a portable terminal, a vehicle or an unmanned helicopter may include a shake correction function structured to swing an optical element to correct a shake in order to restrain disturbance of a photographed image due to the shake of the optical unit. An optical unit with a shake correction function described in Japanese Patent Laid-Open No. 2015-64501 includes a movable body having an optical element, a swing support mechanism structured to swingably support the movable body, a fixed body structured to support the movable body from an outer peripheral side through the swing support mechanism, and a magnetic swing drive mechanism structured to swing the movable body. The swing support mechanism swingably supports the movable body between a reference posture where an axial line previously set and an optical axis of the optical element are coincided with each other and a tilted posture where the optical axis is tilted with respect to the axial line. The magnetic swing drive mechanism includes coils fixed to the movable body and magnets fixed to the fixed body so as to face the coils.

The optical unit with a shake correction function described in the above-mentioned Patent Literature includes a plate spring for returning the swung and tilted movable body to the reference posture. The plate spring is provided between the movable body and the fixed body and is provided with a movable body side fixed part which is fixed to the movable body, a fixed body side fixed part which is fixed to the fixed body, and a meandering part which meanders between the movable body side fixed part and the fixed body side fixed part. The movable body is returned to the reference posture by an elastic return force of the plate spring (meandering part) which is deformed due to a swing.

In order to allow the movable body to swing with respect to the fixed body, the meandering part of the plate spring is formed thin and thus the meandering part is easily plastically deformed. Therefore, handling of the plate spring is not easy and, when an optical unit with a shake correction function is to be manufactured, work for attaching the plate spring between the movable body and the fixed body is not easy. Further, in a case that an impact is applied to the optical unit with a shake correction function from the outside and the optical module is excessively displaced, the meandering part may be plastically deformed and thus the optical module may be unable to return to the reference position.

SUMMARY

In view of the problem described above, at least an embodiment of the disclosure may advantageously provide an optical unit with a shake correction function which is capable of returning the movable body to the reference posture without using a plate spring.

According to at least an embodiment of the disclosure, there may be provided an optical unit with a shake correction function including a movable body having an optical element, a swing support mechanism structured to swingably support the movable body between a reference posture where an axial line previously set and an optical axis of the optical element are coincided with each other and a tilted posture where the optical axis is tilted with respect to the axial line, a fixed body which supports the movable body through the swing support mechanism, a magnetic swing drive mechanism structured to swing the movable body, and a posture return mechanism structured to return the movable body to the reference posture. The magnetic swing drive mechanism includes a coil, which is fixed to one of the movable body and the fixed body, and a magnet fixed to the other of the movable body and the fixed body. The magnet is polarized and magnetized to have different magnetic poles in a direction of the axial line, the posture return mechanism includes the magnet and a magnetic member which is attached to the one of the movable body and the fixed body to which the coil is fixed, and a center of the magnetic member is overlapped with a magnetizing polarized line of the magnet when the movable body in the reference posture is viewed in a radial direction perpendicular to the axial line.

In at least an embodiment of the disclosure, the posture return mechanism structured to return the movable body to the reference posture includes a magnetic member which is disposed at a position overlapping with the magnetizing polarized line of the magnet of the magnetic swing drive mechanism when viewed in a radial direction. Further, the center of the magnetic member is overlapped with the magnetizing polarized line of the magnet when the movable body is located in the reference posture. Therefore, in a case that the movable body is swung with respect to the fixed body and the center of the magnetic member is displaced in an axial line direction from the magnetizing polarized line of the magnet, a magnetic attraction force is acted on the magnetic member in a direction so that the center is returned to the position overlapping with the magnetizing polarized line. As a result, the movable body is returned to the reference posture by the magnetic attraction force. Therefore, the movable body which is swung can be returned to the reference posture without using a plate spring arranged between the movable body and the fixed body.

In at least an embodiment of the disclosure, at least a part of the magnetic member is overlapped with the magnetizing polarized line when the movable body in the tilted posture is viewed in the radial direction. According to this structure, a magnetic attraction force can be surely generated in a direction so that the center of the magnetic member is returned to the position overlapping with the magnetizing polarized line when the movable body is swung between the reference posture and the tilted posture. Therefore, the movable body which is tilted is surely returned to the reference posture.

In at least an embodiment of the disclosure, a length in the direction of the axial line of the magnetic member is longer than a length in a circumferential direction around the axial line. According to this structure, even in a case that the movable body is tilted, the magnetic member is easily overlapped with the magnetizing polarized line when viewed in the radial direction. Further, according to this structure, linearity of a magnetic attraction force generated between the magnet and the magnetic member is easily secured with respect to a tilted angle of the movable body.

In at least an embodiment of the disclosure, a length in the direction of the axial line of the magnetic member is shorter than a length in a circumferential direction around the axial line. According to this structure, a magnetic attraction force between the magnet and the magnetic member is easily increased.

In at least an embodiment of the disclosure, the magnetic member is disposed on an opposite side to the magnet with the coil interposed therebetween in the radial direction. According to this structure, the magnetic member is capable of functioning as a back yoke and thus torque by the magnetic swing drive mechanism for swinging the movable body can be improved. Further, according to this structure, a distance between the magnet and the magnetic member can be secured relatively large. As a result, linearity of a magnetic attraction force generated between the magnet and the magnetic member is easily secured with respect to a tilted angle of the movable body. Further, in a case that the magnetic member and the coil are arranged at the same position in the radial direction, an arranging position and a shape of the magnetic member may be restricted by the coil. However, when the magnetic member is disposed on an opposite side to the magnet with the coil interposed therebetween, a degree of freedom of arrangement and a shape of the magnetic member is improved.

In at least an embodiment of the disclosure, the one of the movable body and the fixed body to which the coil is fixed is provided with a fixed region to which the magnetic member is to be fixed, and a fixed position of the magnetic member is capable of being changed in the fixed region. According to this structure, the reference posture of the movable body can be determined by changing a fixed position of the magnetic member in the fixed region.

In at least an embodiment of the disclosure, the magnetic swing drive mechanism includes a Hall element which is attached to the one of the movable body and the fixed body to which the coil is fixed, the Hall element is disposed between the magnet and the magnetic member in the radial direction, and the Hall element is overlapped with the magnetizing polarized line when the movable body in the reference posture is viewed in the radial direction. According to this structure, it can be detected that the movable body is located in the reference posture based on an output of the Hall element. Further, in a case that the Hall element is disposed between the magnet and the magnetic member, the magnetic field entering from the magnet into the Hall element is not disturbed by the magnetic member. On the other hand, in a case that the Hall element is disposed between the magnet and the magnetic member, the magnetic member functions as a back yoke and thus the magnetic field of the magnet is easily detected by the Hall element. Therefore, even when the movable body is largely tilted, an angle of the movable body can be detected by the Hall element.

In at least an embodiment of the disclosure, the coil and the magnetic member are fixed to the movable body, and the magnet is fixed to the fixed body. Since the coil is light in comparison with the magnet and thus, according to this structure, a weight of the movable body can be reduced.

In at least an embodiment of the disclosure, the magnetic swing drive mechanism includes a pair of the magnetic swing drive mechanisms which are disposed on both sides with the axial line interposed therebetween, the posture return mechanism includes two magnetic members as the magnetic member each of which is attached to the one of the movable body and the fixed body to which the coil of each of the pair of the magnetic swing drive mechanisms is fixed, and each of the two magnetic members is arranged so that a center of the magnetic member is overlapped with a magnetizing polarized line of each of the magnets of the pair of the magnetic swing drive mechanisms when the movable body in the reference posture is viewed in the radial direction perpendicular to the axial line. According to this structure, the movable body can be returned to the reference posture by magnetic attraction forces between the respective magnets of the pair of the magnetic swing drive mechanisms and the respective two magnetic members. Therefore, the movable body is easily returned to the reference position. Further, in a case that the posture return mechanisms are arranged on both sides with the axial line interposed therebetween, when the movable body is moved in a radial direction, a gap space between the magnet and the magnetic member disposed on one side with the axial line interposed therebetween becomes wide and thus, when a magnetic attraction force for returning the movable body to the reference posture is decreased, a gap space between the magnet and the magnetic member disposed on the other side becomes narrow and thus a magnetic attraction force for returning the movable body to the reference posture is increased. Therefore, a magnetic attraction force for returning the movable body to the reference posture is stabilized.

In at least an embodiment of the disclosure, the optical unit with a shake correction function includes a second magnetic swing drive mechanism structured to swing the movable body in a direction different from that of the magnetic swing drive mechanism, the second magnetic swing drive mechanism includes a second coil, which is fixed to one of the movable body and the fixed body, and a second magnet fixed to the other of the movable body and the fixed body, the second magnet is polarized and magnetized to have different magnetic poles in the direction of the axial line, the posture return mechanism includes a second magnetic member which is attached to the one of the movable body and the fixed body to which the second coil is fixed, and a center of the second magnetic member is overlapped with a second magnetizing polarized line of the second magnet when the movable body in the reference posture is viewed in a radial direction. According to this structure, the movable body can be swung around two directions by the magnetic swing drive mechanism and the second magnetic swing drive mechanism. Further, even when the movable body is swung around two directions, the movable body can be returned to the reference posture.

Other features and advantages of the disclosure will be apparent from the following detailed description, taken in conjunction with the accompanying drawings that illustrate, by way of example, various features of embodiments of the disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION (Entire Structure)

An embodiment of an optical unit to which the disclosure is applied will be described below with reference to the accompanying drawings. In this specification, three axes "X", "Y" and "Z" are directions perpendicular to each other. One side in the "X"-axis direction is indicated as "+X", the other side is indicated as "−X", one side in the "Y"-axis direction is indicated as "+Y", the other side is indicated as "−Y", one side in the "Z"-axis direction is indicated as "+Z", and the other side is indicated as "−Z". The "Z"-axis direction is coincided with an axial line direction of the optical unit. The "+Z" direction is an object side in the axial line direction of the optical unit. The "−Z" direction is an anti-object side (image side) in the axial line direction of the optical unit.

Figure 1:
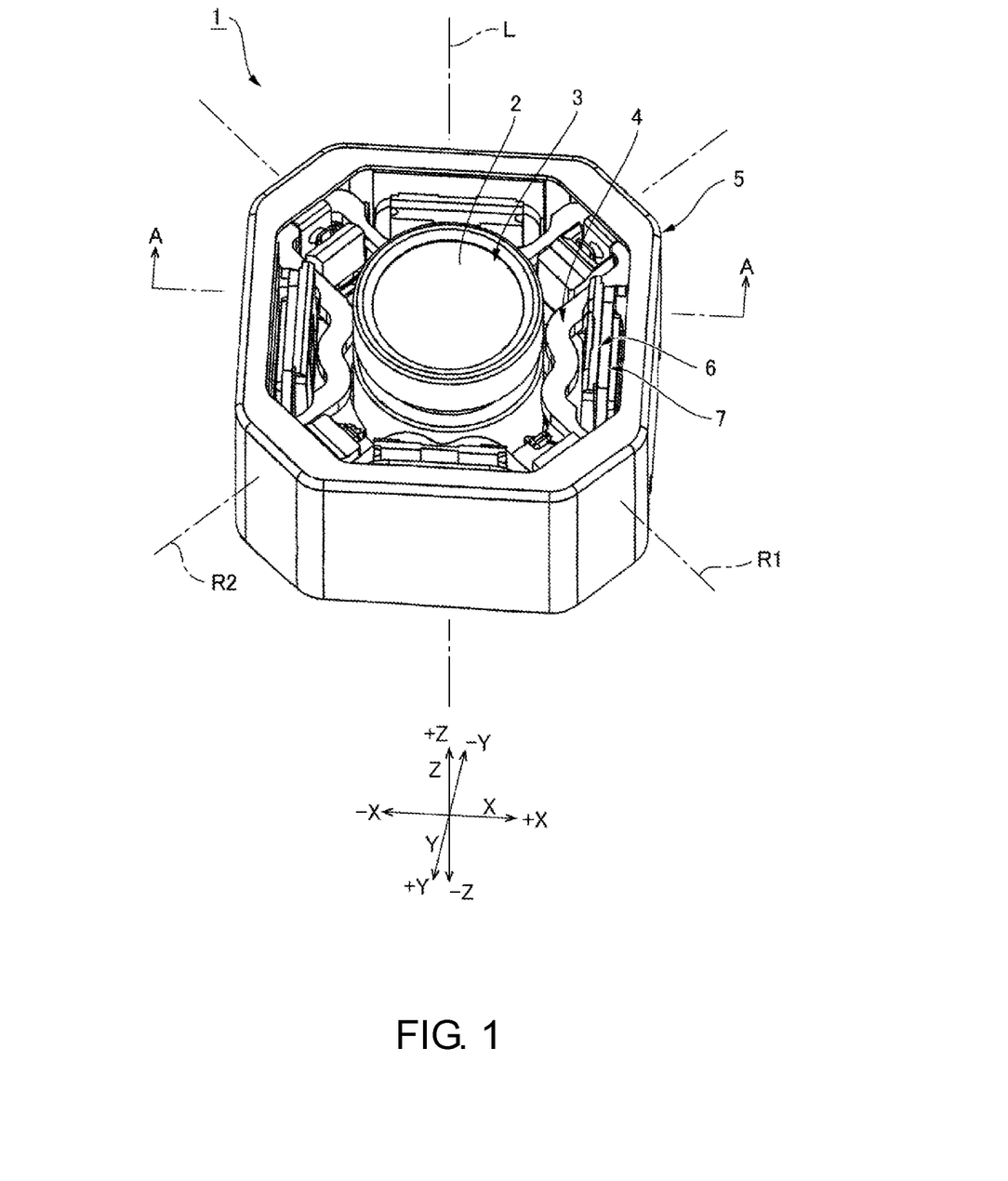
FIG. 1 is a perspective view showing an optical unit with a shake correction function in accordance with an embodiment of the disclosure.
Figure 2:
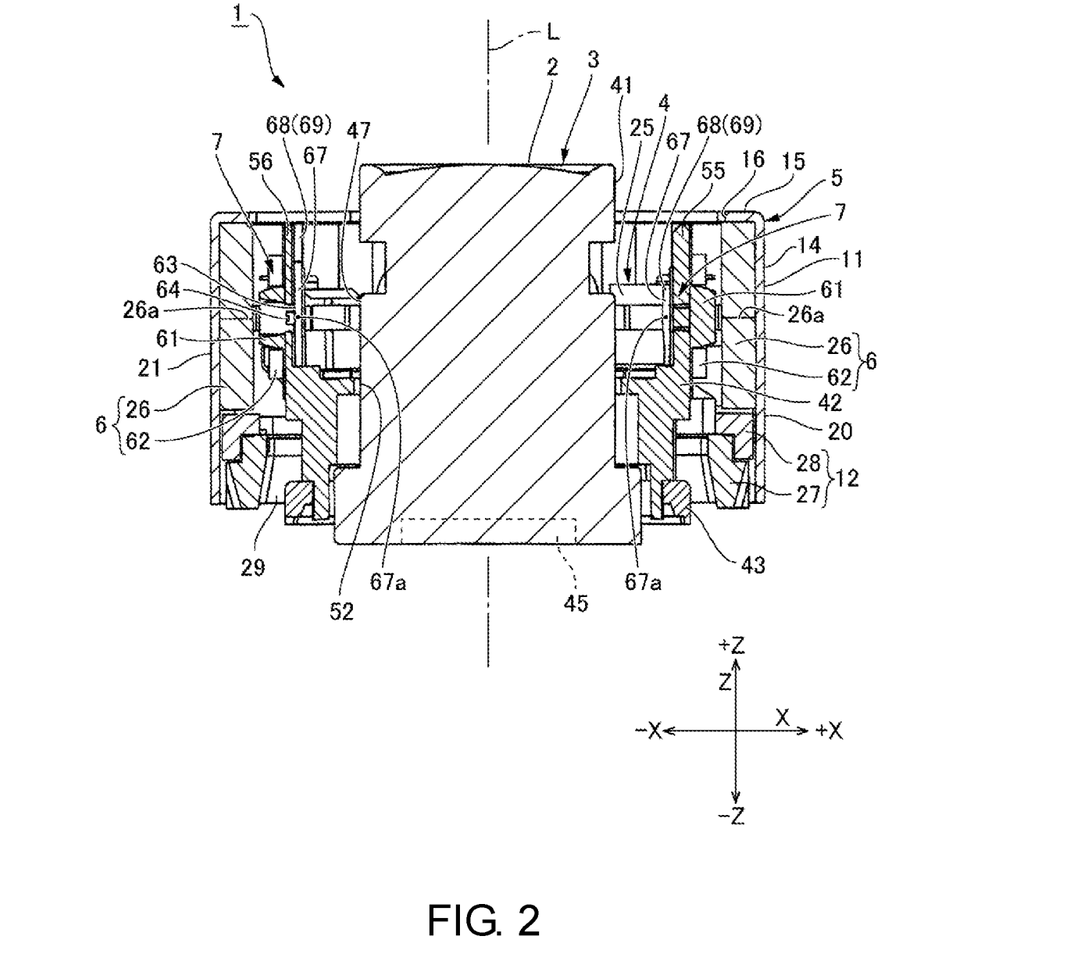
FIG. 2 is a cross-sectional view showing an optical unit with a shake correction function which is cut along an axial line.
Figure 3:
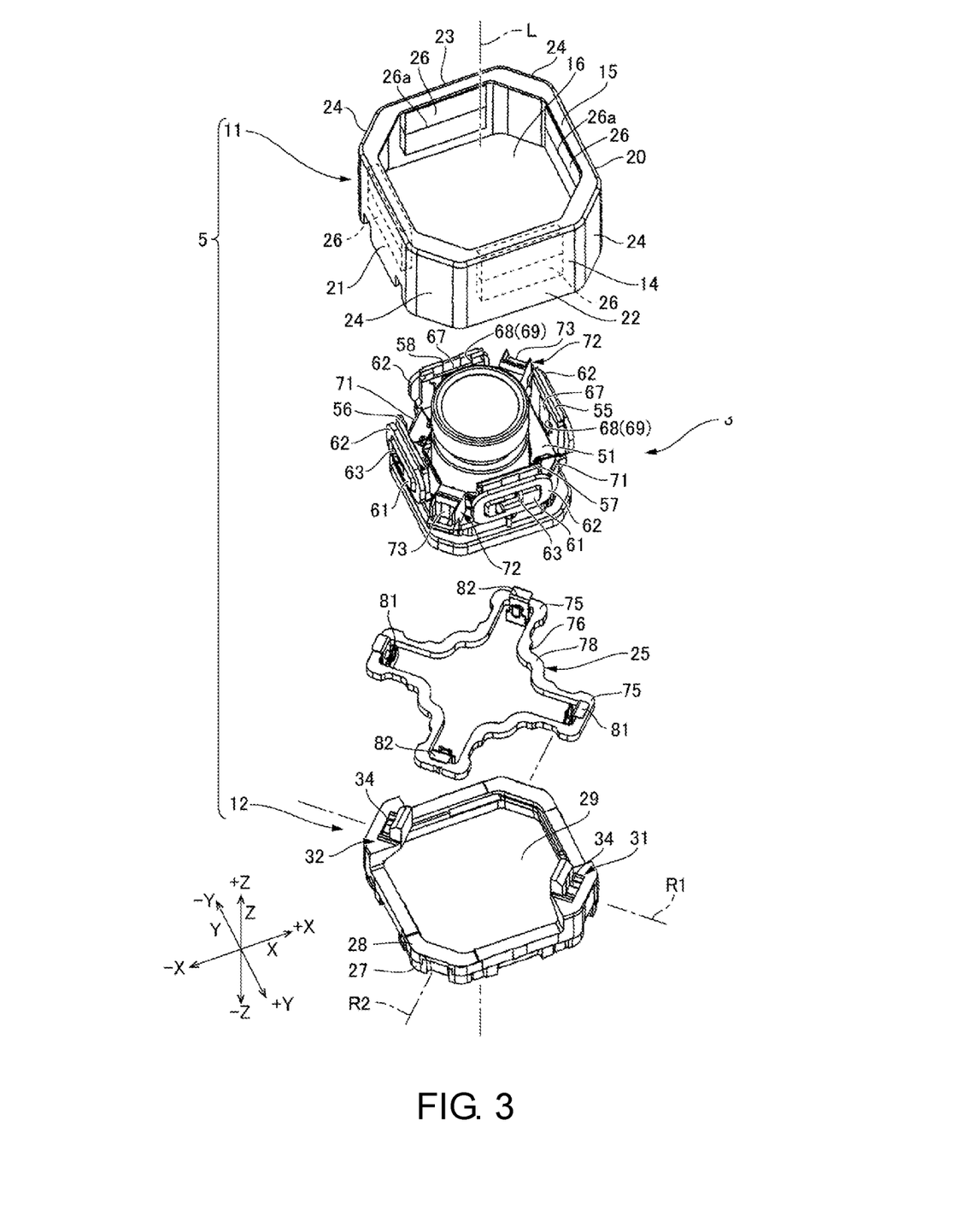
FIG. 3 is an exploded perspective view showing an optical unit with a shake correction function.

FIG. 1 is a perspective view showing an optical unit in accordance with an embodiment of the disclosure which is viewed from an object side. FIG. 2 is a cross-sectional view showing the optical unit which is cut by the "A-A" line in FIG. 1. FIG. 3 is an exploded perspective view showing the optical unit. The optical unit 1 is, for example, used in an optical device such as a cell phone with a camera and a drive recorder or in an optical device such as an action camera mounted on a helmet, a bicycle, a radio-controlled helicopter and the like or a wearable camera. In the optical device, when a shake is occurred in the optical device at the time of photographing, disturbance of a photographed image is generated. The optical unit 1 is an optical unit with a shake correction function structured to correct a tilt of an optical element 2 in order to avoid an inclination of a photographed image.

The optical unit 1 includes a movable body 3 having an optical element 2, a swing support mechanism 4 which swingably supports the movable body 3, and a fixed body 5 which supports the movable body 3 through the swing support mechanism 4. Further, the optical unit 1 includes a magnetic swing drive mechanism 6 structured to swing the movable body 3, and a posture return mechanism 7 structured to return the swung movable body 3 to a reference posture.

The swing support mechanism 4 is a gimbal mechanism. The swing support mechanism 4 swingably supports the movable body 3 between a reference posture where an axial line "L" previously set and an optical axis of the optical element 2 are coincided with each other and a tilted posture where the optical axis is tilted with respect to the axial line "L". The movable body 3 is swingably supported around a first axial line "R1" (see FIG. 1) intersecting the axial line "L" and is swingably supported around a second axial line "R2" (see FIG. 1) intersecting the axial line "L" and the first axial line "R1" by the swing support mechanism 4. The first axial line "R1" and the second axial line "R2" are diagonal directions of the fixed body 5 and are perpendicular to the axial line "L" of the fixed body 5 (axial line "L" of the optical unit 1). Further, the first axial line "R1" and the second axial line "R2" are perpendicular to each other.

(Fixed Body)

As shown in FIG. 3, the fixed body 5 includes a first case 11 formed in a substantially octagonal outward shape when viewed in the "Z"-axis direction, and a second case 12 which is assembled to the first case 11 from the "−Z" direction side. The first case 11 is fixed to the second case 12 by welding or the like. The first case 11 is provided with a body part 14 in a rectangular tube shape which surrounds the movable body 3 and an end plate part 15 in a rectangular frame shape which is projected to an inner side from an end part in the "+Z" direction of the body part 14. A window 16 is formed at a center of the end plate part 15. The body part 14 is provided with side plates 20 and 21 facing each other in the "X"-axis direction, side plates 22 and 23 facing each other in the "Y"-axis direction, and side plates 24 which are provided at four corner parts so as to be inclined by 45 degrees with respect to the "X"-axis direction and the "Y"-axis direction. As shown in FIG. 3, a swing drive magnet 26 is fixed to each of inner peripheral faces of the side plates 20 and 21 facing in the "X"-axis direction and the side plates 22 and 23 facing in the "Y"-axis direction. Each of the swing drive magnets 26 is polarized and magnetized to have different magnetic poles in the "Z"-axis direction as shown in FIG. 2 and FIG. 3. Therefore, each of the swing drive magnets 26 is magnetized so that magnetic poles on an inner face are different from each other with a magnetizing polarized line 26a which is extended in the circumferential direction perpendicular to the axial line "L" as a boundary.

The second case 12 is structured of two members, i.e., a first member 27 in a rectangular frame shape and a second member 28 in a rectangular frame shape which is attached to the "+Z" direction side of the first member 27. The second case 12 is provided with a rectangular opening part 29. The second member 28 is provided with side wall parts 31 and 32 which are stood up to the "+Z" direction at diagonal positions on the first axial line "R1". Each of the side wall parts 31 and 32 is formed with a first contact spring holding part 34 which structures a first swing support part 33 of the swing support mechanism 4.

(Movable Body)

Figure 4:
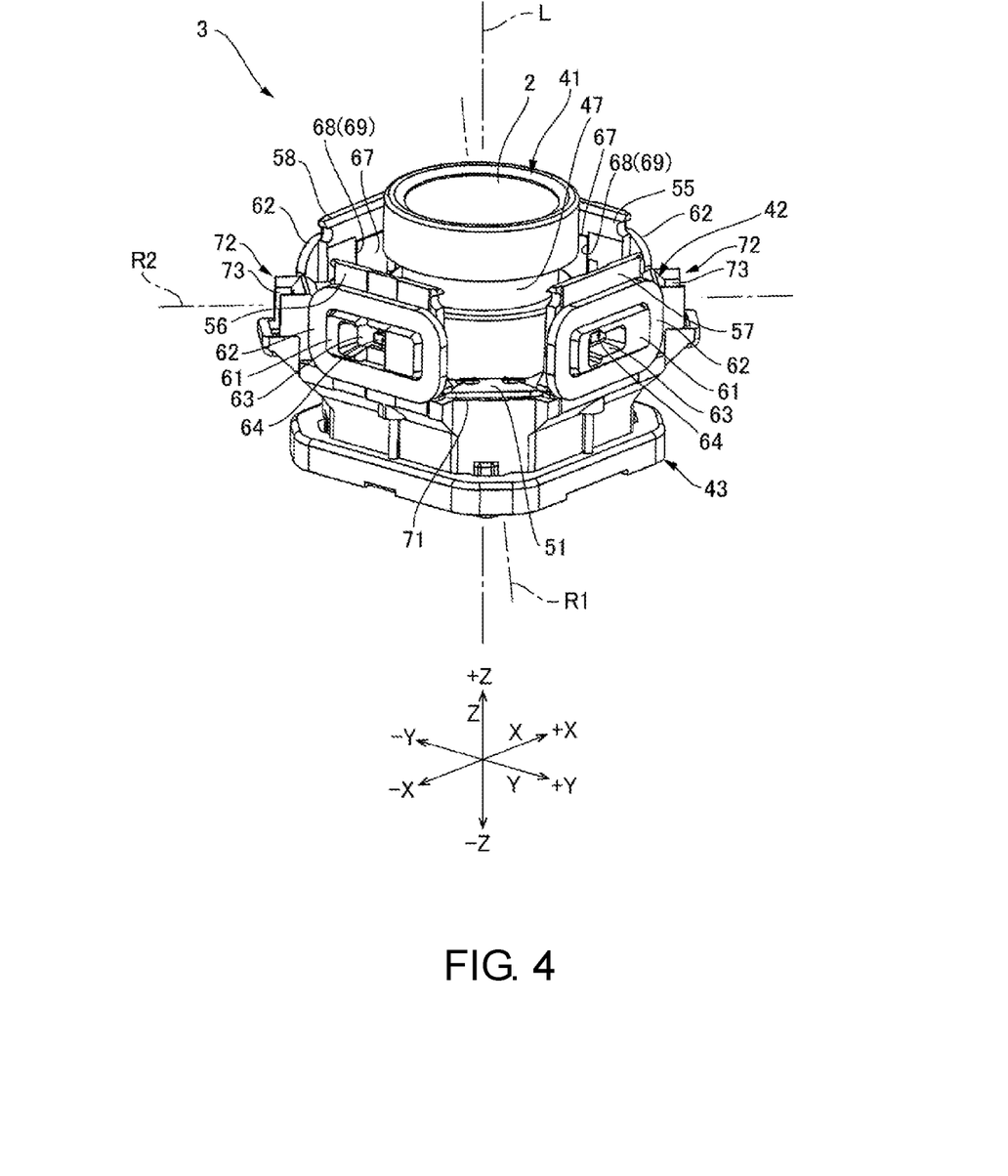
FIG. 4 is a perspective view showing a movable body.

As shown in FIG. 4, the movable body 3 includes an optical module 41, an optical module holder 42 which holds the optical module 41, and a frame-shaped stopper 43 which is attached to an end part in the "−Z" direction of the optical module holder 42. The stopper 43 is structured to be abutted with an inner peripheral face of the second case 12 of the fixed body 5 when the movable body 3 is excessively swung and a swing range of the movable body 3 is restricted. The optical module 41 is disposed so that its optical axis direction is coincided with the axial line "L" ("Z"-axis direction). The optical module 41 includes the optical element 2 and an imaging element 45 disposed on the optical axis of the optical element 2 (see FIG. 2). Further, the optical module 41 includes a lens barrel part 47 in a tube shape which holds the optical element 2 on its inner peripheral side.

The optical module holder 42 is, as shown in FIG. 3 and FIG. 4, provided with a frame part 51 whose planar shape is a substantially square shape when viewed in the "Z"-axis direction. A center of the frame part 51 is provided with a circular holding hole 52 (see FIG. 2) into which a lens barrel part 47 of the optical module 41 is inserted.

The optical module holder 42 is provided with a pair of wall parts 55 and 56, which are stood up to the "+Z" direction and extended in the "Y"-axis direction at both ends in the "X"-axis direction of the frame part 51, and a pair of wall parts 57 and 58 which are stood up to the "+Z" direction and extended in the "X"-axis direction at both ends in the "Y"-axis direction of the frame part 51.

An outer side face of each of the wall parts 55, 56, 57 and 58 facing an outer side in the radial direction is provided with a coil fixed part 61. A swing drive coil 62 is fixed to each of the coil fixed parts 61 in a posture that its center hole is directed to an outer side in the radial direction. Further, a Hall element fixed part 63 is provided in the coil fixed parts 61 of the wall part 56 and the wall part 57. As shown in FIG. 4, a Hall element 64 is fixed to the Hall element fixed part 63. The Hall element 64 is located at a center of each of the swing drive coils 62 in the "Z"-axis direction.

As shown in FIG. 3 and FIG. 4, an inner side face of each of the wall parts 55, 56, 57 and 58 facing an inner side in the radial direction is provided with a fixed region 68 to which a magnetic member 67 is to be fixed. The fixed region 68 is a groove 69 provided in the inner side face which is extended in the "Z"-axis direction with a constant width. The magnetic member 67 is formed in a rectangular plate shape and its dimension in the "Z"-axis direction is longer than that in the circumferential direction. The magnetic member 67 is fixed to the groove 69 (fixed region 68) in a posture that its longitudinal direction is directed in the "Z"-axis direction. The magnetic member 67 is fixed to the groove 69 with an adhesive after a fixed position of the magnetic member 67 is adjusted in the groove 69 in the "Z" direction so that a center 67a of the magnetic member 67 is overlapped (coincided) with a magnetizing polarized line 26a of the swing drive magnet 26 when a state that the movable body 3 is located in the reference posture is viewed in the radial direction (direction which is perpendicular to the axial line "L"). In other words, the groove 69 is formed so that a fixed position in the "Z" direction of the magnetic member 67 can be adjusted. In accordance with an embodiment of the disclosure, a magnetic member 67 in a rectangular plate shape may be used whose dimension in a circumferential direction is larger than a dimension in the "Z"-axis direction and, in this case, a magnetic attraction force between the swing drive magnet 26 and the magnetic member 67 can be easily increased.

A cut-out part 71 which is cut out by a face perpendicular to the first axial line "R1" is provided at diagonal positions on the first axial line "R1" of the frame part 51. When the movable body 3 is assembled to the fixed body 5, the side wall parts 31 and 32 provided at diagonal positions on the first axial line "R1" of the second case 12 are disposed in the cut-out parts 71. Therefore, the first contact spring holding parts 34 provided in the side wall parts 31 and 32 are disposed at the diagonal positions on the first axial line "R1" of the frame part 51 (see FIG. 4). Further, second contact spring holding parts 73 structuring second swing support parts 72 of the swing support mechanism 4 are formed at diagonal positions on the second axial line "R2" of the frame part 51.

(Swing Support Mechanism)

The swing support mechanism 4 is structured between the second case 12 and the optical module holder 42. The swing support mechanism 4 includes, as shown in FIG. 5, first swing support parts 33 disposed at two positions separated from each other in the first axial line "R1" direction when the movable body 3 is assembled to the fixed body 5, second swing support parts 72 disposed at two positions separated from each other in the second axial line "R2" direction, and a movable frame 25 which is supported by the first swing support parts 33 and the second swing support parts 72.

Figure 5:
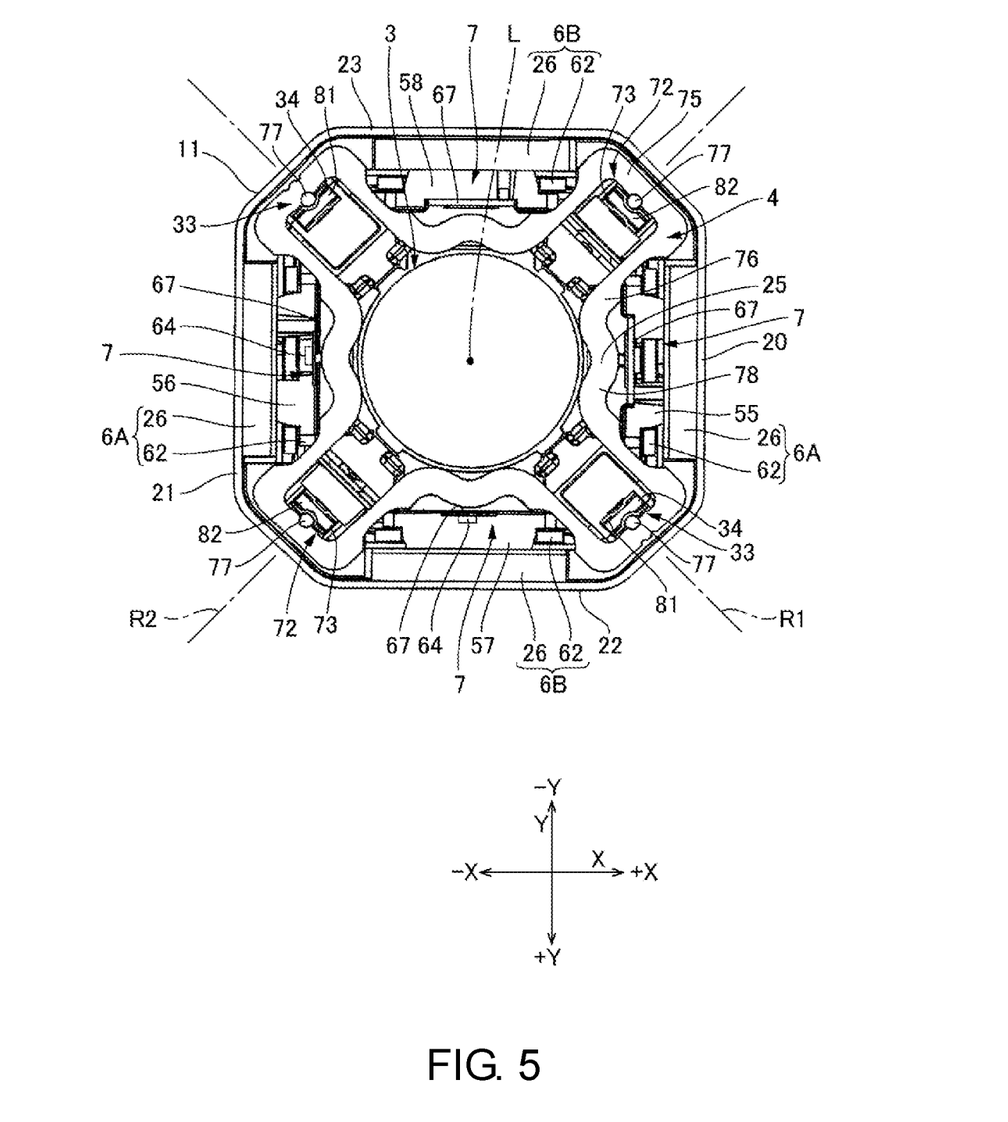
FIG. 5 is a cross-sectional view showing an optical unit with a shake correction function which is cut by a plane perpendicular to an axial line.

As shown in FIG. 3 and FIG. 5, the movable frame 25 is a gimbal spring formed in a schematically rectangular shape. The movable frame 25 is provided with supporting point parts 75 provided at four positions around the axial line "L" and connecting parts 76 which connect adjacent supporting point parts 75 with each other around the axial line "L". As shown in FIG. 5, a metal spherical body 77 is fixed to an inner side face of each of the supporting point parts 75 by welding or the like. Each of the supporting point parts 75 is provided with a convex face in a hemispheric shape facing to a center of the movable frame 25 by the spherical body 77. The connecting part 76 is provided with a meandering part 78 extended in the "X"-axis direction or the "Y"-axis direction, and the connecting part 76 is capable of being elastically deformed in a direction perpendicular to the axial line "L".

The first swing support part 33 includes a first contact spring holding part 34 provided in the second case 12 of the fixed body 5 and a first contact spring 81 which is held by the first contact spring holding part 34. The first contact spring 81 is a metal plate spring which is bent in a "U"-shape. The first swing support parts 33 are disposed on an inner peripheral side of the supporting point parts 75 provided at diagonal positions in the first axial line "R1" direction. The first swing support parts 33 support the movable frame 25 through the first contact springs 81 which are attached in an elastically deformable state in the first axial line "R1" direction.

The second swing support part 72 includes a second contact spring holding part 73 provided in the optical module holder 42 of the movable body 3 and a second contact spring 82 which is held by the second contact spring holding part 73. The second contact spring 82 is a metal plate spring which is bent in a "U"-shape and has the same shape as the first contact spring 81. The second swing support parts 72 support the movable frame 25 through the second contact springs 82 which are attached in an elastically deformable state in the second axial line "R2" direction.

As shown in FIG. 5, a contact point part in a hemispheric shape is formed in each of the first contact springs 81 of the first swing support parts 33 and each of the second contact springs 82 of the second swing support parts 72 so as to contact with the spherical body 77 welded to the supporting point part 75. The contact point parts in a hemispheric shape of the first contact springs 81 and the second contact springs 82 are in point contact with the spherical bodies 77 in the supporting point parts 75 provided at four positions around the axial line "L" and, in this manner, the movable frame 25 is supported. Further, the first contact spring 81 held by the first swing support part 33 is capable of being elastically deformed in the first axial line "R1" direction, and the second contact spring 82 held by the second swing support part 72 is capable of being elastically deformed in the second axial line "R2" direction. Therefore, the movable frame 25 is supported in a turnable state around respective two directions perpendicular to the "Z"-axis direction (first axial line "R1" direction and second axial line "R2" direction).

(Magnetic Swing Drive Mechanism)

The magnetic swing drive mechanism 6 includes, as shown in FIG. 5, a first magnetic swing drive mechanism 6A (magnetic swing drive mechanism) and a second magnetic swing drive mechanism 6B (second magnetic swing drive mechanism) which are provided between the movable body 3 and the first case 11. The first magnetic swing drive mechanism 6A includes two pairs of swing drive magnets 26 and swing drive coils 62 facing each other in the "X"-axis direction. Further, the first magnetic swing drive mechanism 6A on the "−X" direction side includes a Hall element 64 (see FIG. 4) which is disposed on an inner side of the swing drive coil 62. The second magnetic swing drive mechanism 6B includes two pairs of swing drive magnets 26 and swing drive coils 62 facing each other in the "Y"-axis direction. Further, the second magnetic swing drive mechanism 6B on the "+Y" direction side includes a Hall element 64 (see FIG. 4) which is disposed on an inner side of the swing drive coil 62.

The swing drive coils 62 are respectively held by outer side faces of wall parts 55 and 56 on both sides in the "X"-axis direction and by outer side faces of wall parts 57 and 58 on both sides in the "Y"-axis direction of the optical module holder 42. The swing drive magnets 26 are held by inner side faces of the side plates 20, 21, 22 and 23 of the body part 14 of the first case 11. Each of the swing drive magnets 26 is, as shown in FIGS. 2 and 3, divided into two pieces in the "Z"-axis direction and is provided with the magnetizing polarized line 26a at a center in the "Z"-axis direction. Long side portions on the "+Z" direction side and the "−Z" direction side of the swing drive coil 62 are utilized as an effective side. When the movable body 3 is located in the reference posture, each of the Hall elements 64 faces the magnetizing polarized line 26a of the swing drive magnet 26 which is disposed on an outer peripheral side. In this embodiment, the first case 11 is structured of magnetic material and thus the first case 11 functions as a yoke for the swing drive magnet 26.

Two pairs of the second magnetic swing drive mechanisms 6B disposed on the "+Y" direction side and the "−Y" direction side of the movable body 3 are electrically connected so that magnetic-drive forces in the same direction around the "X"-axis are generated at the time of energization to the swing drive coils 62. Further, two pairs of the first magnetic swing drive mechanisms 6A disposed on the "+X" direction side and the "−X" direction side of the movable body 3 are electrically connected so that magnetic-drive forces in the same direction around the "Y"-axis are generated at the time of energization to the swing drive coils 62. The magnetic swing drive mechanism 6 turns the optical module 41 around the first axis "R1" and around the second axis "R2" by combining turning around the "X"-axis by the second magnetic swing drive mechanism 6B and turning around the "Y"-axis by the first magnetic swing drive mechanism 6A. When a shake correction around the "X"-axis and a shake correction around the "Y"-axis are to be performed, turning around the first axis "R1" and turning around the second axis "R2" are combined.

(Posture Return Mechanism)

Figure 6A:
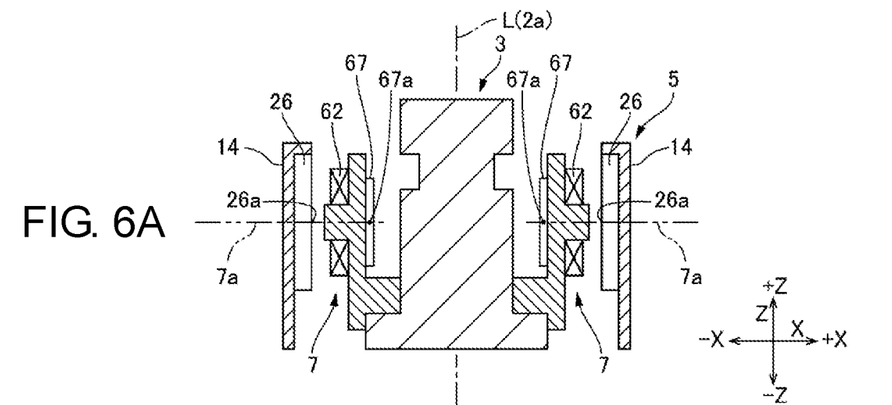
FIG. 6A, FIG. 6B and FIG. 6C are explanatory views showing a posture return mechanism.
Figure 6B:
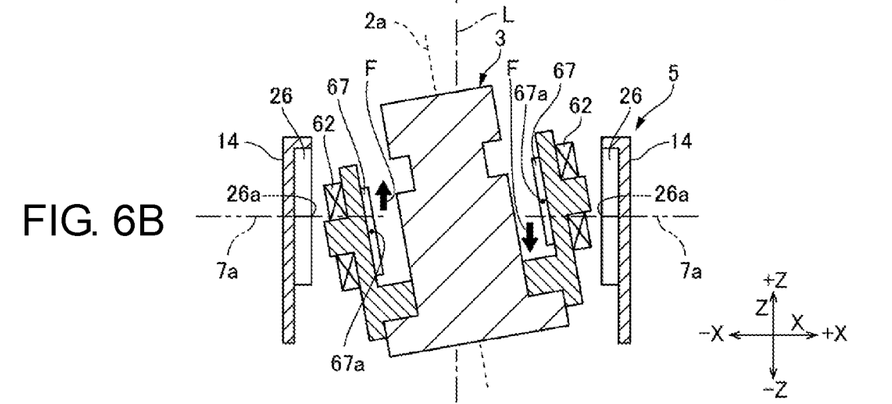
Figure 6C:
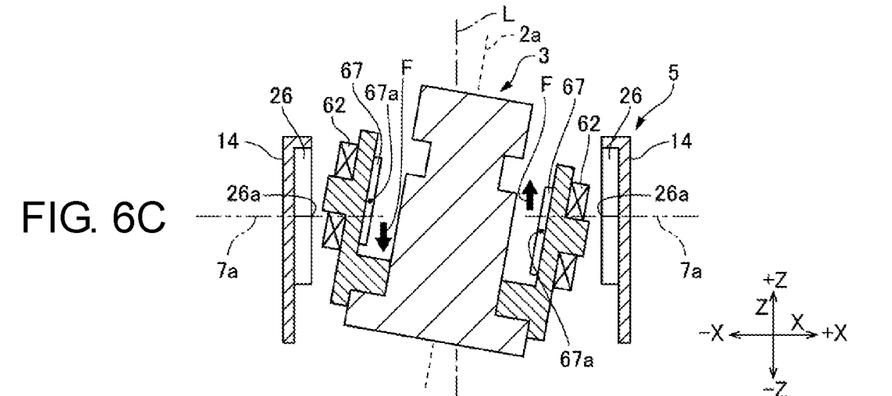

In this embodiment, the swing drive magnet 26 and the magnetic member 67 structure the posture return mechanism 7 structured to return the movable body 3 tilted due to a swing to the reference posture. FIG. 6A, FIG. 6B and FIG. 6C are explanatory views showing the posture return mechanism 7. FIG. 6A, FIG. 6B and FIG. 6C schematically show states that the movable body 3 and the body part 14 of the first case 11 are cut by the "X-Z" plane. A state shown in FIG. 6A is the reference posture of the movable body 3 in which the axial line "L" and the optical axis 2a of the optical element 2 are coincided with each other. In FIG. 6B and FIG. 6C, the axial line "L" and the optical axis 2a of the optical element 2 are not coincided with each other and thus the movable body 3 is tilted. A posture of the movable body 3 shown in FIG. 6B and FIG. 6C is a tilted posture, and the movable body 3 is capable of being swung in an angular range shown in FIG. 6B and FIG. 6C. The posture return mechanism 7 is provided at four positions in the circumferential direction. In FIG. 6A, FIG. 6B and FIG. 6C, the states that the movable body 3 and the body part 14 of the first case 11 are cut by the "X-Z" plane are shown. However, the states that the movable body 3 and the body part 14 of the first case 11 are cut by the "Y-Z" plane are also similar to those shown in FIG. 6A, FIG. 6B and FIG. 6C.

As shown in FIG. 6A, FIG. 6B and FIG. 6C, the magnetic member 67 in each of the posture return mechanisms 7 is disposed on an opposite side to the swing drive magnet 26 with the swing drive coil 62 interposed therebetween in the radial direction. Further, as shown in FIG. 6A, when the state that the movable body 3 swingably held by the fixed body 5 is located in the reference posture is viewed in the radial direction, the center 67a of the magnetic member 67 is located at a position overlapping and coincided with the magnetizing polarized line 26a of the swing drive magnet 26 which is disposed on an outer peripheral side. In other words, in a state that the movable body 3 is located in the state of the reference posture, an imaginary face 7a which includes the magnetizing polarized line 26a and is perpendicular to the "Z"-axis passes the center 67a of the magnetic member 67.

Next, as shown in FIG. 6B and FIG. 6C, when the movable body 3 is tilted to one side or the other side from the reference posture, the center 67a of the magnetic member 67 is displaced from the magnetizing polarized line 26a of the swing drive magnet 26 in the "Z"-axis direction. As a result, a magnetic attraction force is acted between the magnetic member 67 and the swing drive magnet 26 in a direction so that the center 67a of the magnetic member 67 is attracted to a side where the magnetizing polarized line 26a of the swing drive magnet 26 is located. In other words, when the movable body 3 is tilted from the reference posture, a magnetic attraction force "F" is acted between the magnetic member 67 and the swing drive magnet 26 in a direction that the movable body 3 is returned to the reference posture. Therefore, the magnetic member 67 and the swing drive magnet 26 functions as the posture return mechanism 7 structured to return the movable body 3 to the reference posture.

In this embodiment, as shown in FIG. 6A through FIG. 6C, in a case that the movable body 3 is swung between the reference posture and the tilted posture (swing range), when the magnetic member 67 is viewed in the radial direction, the magnetic member 67 is overlapped with the magnetizing polarized line 26a of the swing drive magnet 26. In other words, when viewed in the radial direction, the magnetic member 67 is always overlapped with the magnetizing polarized line 26a of the swing drive magnet 26 in the permitted swing range. Therefore, according to this posture return mechanism 7, a magnetic attraction force "F" can be surely generated in a direction that the center 67a of the magnetic member 67 is returned to the position overlapping with the magnetizing polarized line 26a. Accordingly, the movable body 3 being tilted can be surely returned to the reference posture.

Further, in this embodiment, a length in the "Z"-axis direction (axial line "L" direction) of the magnetic member 67 is longer than a length in its circumferential direction. Therefore, even in a case that the movable body 3 becomes a tilted posture, the magnetic member 67 is easily overlapped with the magnetizing polarized line 26*a* when viewed in the radial direction. Further, according to this structure, linearity of a magnetic attraction force "F" generated between the magnet 26 and the magnetic member 67 is easily secured with respect to a tilted angle of the movable body 3 which is swung.

(Shake Correction of Optical Unit)

The optical unit 1 includes, as described above, the magnetic swing drive mechanism 6 structured to perform a shake correction around the "X"-axis and a shake correction around the "Y"-axis. Therefore, shake corrections in the pitching (vertical swing) direction and in the yawing (lateral swing) direction can be performed. In this embodiment, the optical unit 1 includes a gyroscope in the movable body 3 and thus shakes around two axes perpendicular to each other are detected by the gyroscope and the magnetic swing drive mechanism 6 is driven to cancel the detected shake.

(Operations and Effects)

In this embodiment, the swing drive magnet 26 and the magnetic member 67 structure the posture return mechanism 7 which is structured to return the swung movable body 3 to the reference posture. Therefore, the movable body 3 can be returned to the reference posture without providing a plate spring between the movable body 3 and the fixed body 5.

Figure 7:
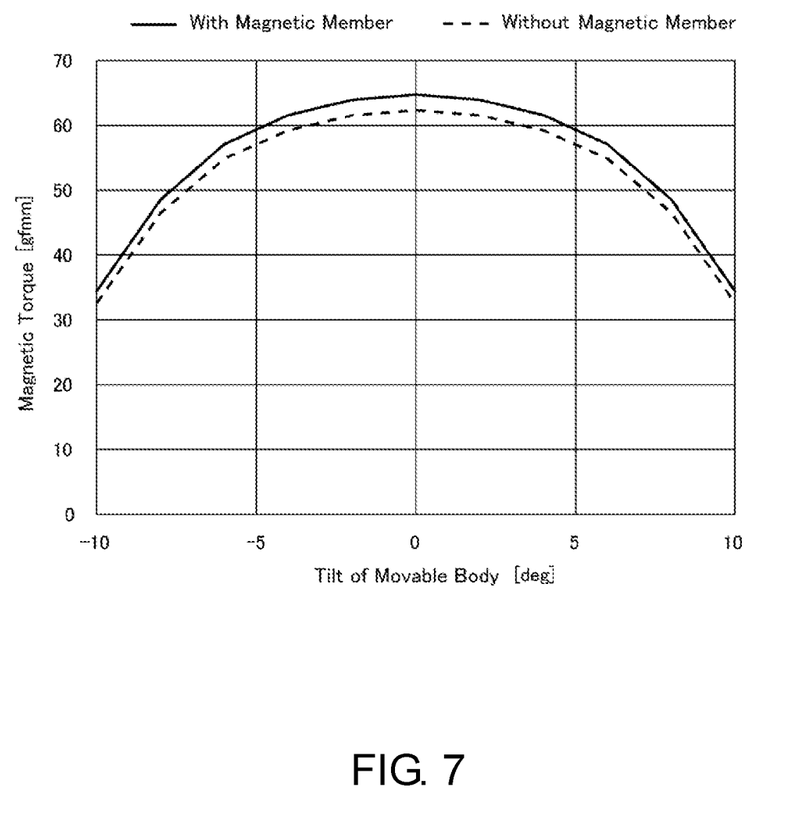
FIG. 7 is a graph showing a relationship between a tilt of a movable body and torque generated by a magnetic swing drive mechanism.

Further, the magnetic member 67 is disposed on an opposite side to the swing drive magnet 26 with the swing drive coil 62 interposed therebetween in the radial direction. Therefore, the magnetic member 67 can be served as a back yoke for the swing drive magnet 26 and thus torque by the magnetic swing drive mechanism 6 for swinging the movable body 3 can be increased. FIG. 7 is a graph showing torque by the magnetic swing drive mechanism 6 for swinging the movable body 3 in which a case provided with the magnetic member 67 is compared with a case provided with no magnetic member 67. The horizontal axis of the graph indicates a tilt of the optical axis 2*a* of the movable body 3 with respect to the "Z"-axis. The vertical axis indicates torque generated by the magnetic swing drive mechanism 6. As shown in FIG. 7, when the magnetic member 67 is provided, torque by the magnetic swing drive mechanism 6 is improved by about 4%.

In a case that the magnetic member 67 and the swing drive coil 62 are arranged at the same position in the radial direction, an arranging position and a shape of the magnetic member 67 may be restricted by the swing drive coil 62. However, when the magnetic member 67 is disposed on an opposite side to the swing drive magnet 26 with the swing drive coil 62 interposed therebetween, a degree of freedom of arrangement and a shape of the magnetic member 67 is improved.

Further, in this embodiment, when the movable body 3 is viewed in the radial direction in a state that the magnetic swing drive mechanism 6 is located in the reference posture, the Hall element 64 is provided so as to be overlapped with the magnetizing polarized line 26*a*. Therefore, the reference posture of the movable body 3 can be detected based on an output of the Hall element 64.

In this embodiment, the Hall element 64 is disposed between the swing drive magnet 26 and the magnetic member 67 in the radial direction. Therefore, a magnetic field entering into the Hall element 64 from the swing drive magnet 26 is not disturbed by the magnetic member 67. On the other hand, when the Hall element 64 is disposed between the swing drive magnet 26 and the magnetic member 67, the magnetic member 67 functions as a back yoke and thus a magnetic field of the swing drive magnet 26 is easily detected by the Hall element 64.

Figure 8A:
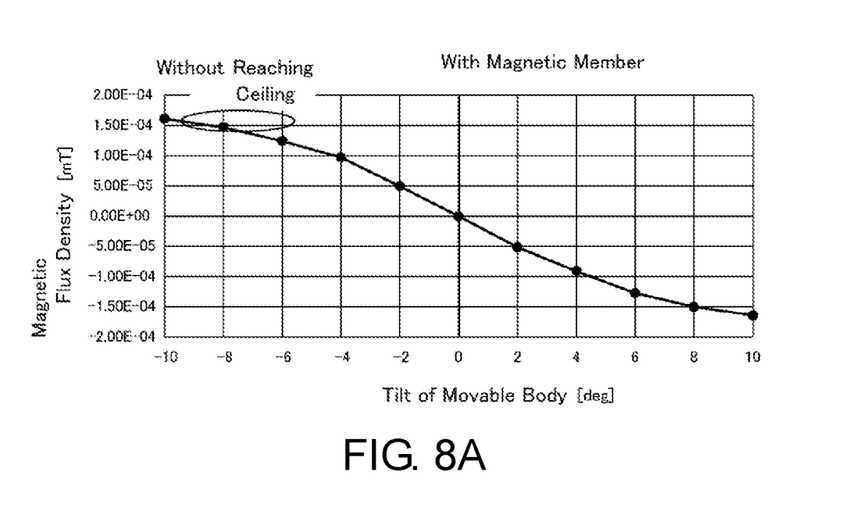
FIG. 8A and FIG. 8B are graphs showing a relationship between a tilt of a movable body and magnetic flux density of a Hall element.
Figure 8B:
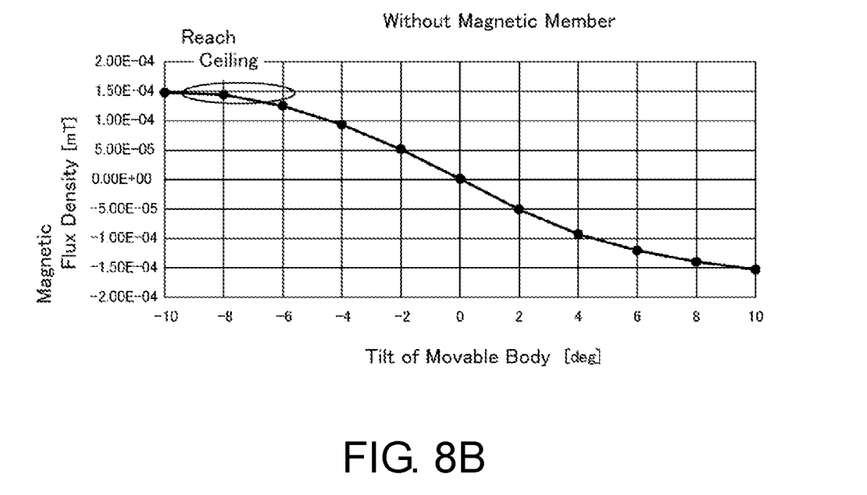

FIG. 8A and FIG. 8B are graphs showing magnetic flux density in the Hall element 64 in which a case provided with the magnetic member 67 is compared with a case provided with no magnetic member 67. FIG. 8A shows a case provided with the magnetic member 67 and FIG. 8B shows a case provided with no magnetic member 67. The horizontal axis of the graph indicates a tilt of the optical axis 2*a* of the movable body 3 with respect to the "Z"-axis. The vertical axis indicates magnetic flux density in the Hall element 64. As shown in FIG. 8A and FIG. 8B, in a case that the magnetic member 67 is provided and the magnetic member 67 functions as a back yoke, when a tilt of the movable body 3 becomes large, for example, even when a tilt of the movable body 3 (angle of the optical axis 2*a* with respect to the axial line "L") becomes from −8 deg to −10 deg, the magnetic flux density in the Hall element 64 is still increased without decreasing (without reaching a ceiling). Therefore, when the magnetic member 67 is provided, even in a case that a tilt of the movable body 3 is large, an angle of the movable body 3 can be detected by the Hall element 64 with a high degree of accuracy.

Further, in this embodiment, the magnetic member 67 is disposed on an opposite side in the radial direction to the swing drive magnet 26 with the swing drive coil 62 interposed therebetween. As a result, since a distance between the swing drive magnet 26 and the magnetic member 67 can be secured relatively longer, linearity of a magnetic attraction force "F" generated between the swing drive magnet 26 and the magnetic member 67 can be easily secured with respect to a tilt angle that the movable body 3 is swung. In other words, in a case that the swing drive magnet 26 and the magnetic member 67 are arranged too close to each other, when a tilt angle of the movable body 3 becomes large, it may be occurred that a magnetic attraction force "F" is abruptly become weak. On the other hand, when a distance between the swing drive magnet 26 and the magnetic member 67 is secured to be large, such an abrupt variation of a magnetic attraction force "F" can be prevented or suppressed.

In addition, in this embodiment, the movable body 3 is provided with the fixed region 68 to which the magnetic member 67 is to be fixed and a fixed position of the magnetic member 67 is capable of being moved in the fixed region 68. Therefore, the center 67*a* of the magnetic member 67 can be easily coincided with the magnetizing polarized line 26*a* of the swing drive magnet 26. Further, the reference posture of the movable body 3 can be determined by changing the fixed position of the magnetic member 67 in the fixed region 68.

Further, in this embodiment, a pair of the magnetic swing drive mechanisms 6 disposed on both sides with the axial line "L" interposed therebetween are provided as the magnetic swing drive mechanism 6, and the magnetic members 67 are respectively provided as the magnetic member 67 at the positions overlapped in the radial direction with the respective swing drive magnets 26 of a pair of the magnetic swing drive mechanisms 6. In other words, the optical unit 1 in this embodiment is provided with a pair of the posture return mechanisms 7 on both sides with the axial line "L" interposed therebetween. Therefore, the movable body 3 can be easily returned to the reference position. Further, in a case that a pair of the posture return mechanisms 7 is arranged on both sides with the axial line "L" interposed therebetween, when the movable body 3 is moved in a radial direction, a gap space between the swing drive magnet 26 and the magnetic member 67 disposed on one side in a pair of the posture return mechanisms 7 with the axial line "L" interposed therebetween becomes wide and thus, when a magnetic attraction force "F" for returning the movable body 3 to the reference posture is decreased, a gap space between the swing drive magnet 26 and the magnetic member 67 disposed on the other side becomes narrow and thus a magnetic attraction force "F" for returning the movable body 3 to the reference posture is increased. Therefore, a magnetic attraction force "F" for returning the movable body 3 to the reference posture is stabilized.

In addition, in this embodiment, the first magnetic swing drive mechanism 6A and the second magnetic swing drive mechanism 6B are provided which are structured to swing the movable body 3 in directions different from each other. Further, the magnetic members 67 are respectively provided at positions overlapping in the radial direction with the respective swing drive magnets 26 of the first and the second magnetic swing drive mechanisms 6A and 6B. Therefore, even when the movable body 3 is swung around two directions, the movable body 3 can be returned to the reference posture.

(Modified Embodiments)

In the embodiment described above, the magnetic member 67 is formed in a plate shape. However, the magnetic member 67 may be formed in a bar shape such as a quadrangular prism shape and a circular column shape. Further, a length in the "Z"-axis direction of the magnetic member 67 may be set shorter than a length in its circumferential direction when the magnetic member 67 is always overlapped with the magnetizing polarized line 26a of the swing drive magnet 26 in a case that a state that the movable body 3 is swung is viewed in the radial direction. In this case, when a length in the circumferential direction is increased, a magnetic attraction force "F" between the swing drive magnet 26 and the magnetic member 67 can be increased. In accordance with an embodiment of the disclosure, a magnetic attraction force "F" between the swing drive magnet 26 and the magnetic member 67 can be adjusted by adjusting a thickness of the magnetic member 67. In this case, when a thickness dimension of the magnetic member 67 is increased, a magnetic attraction force "F" between the swing drive magnet 26 and the magnetic member 67 can be increased.

Figure 9:
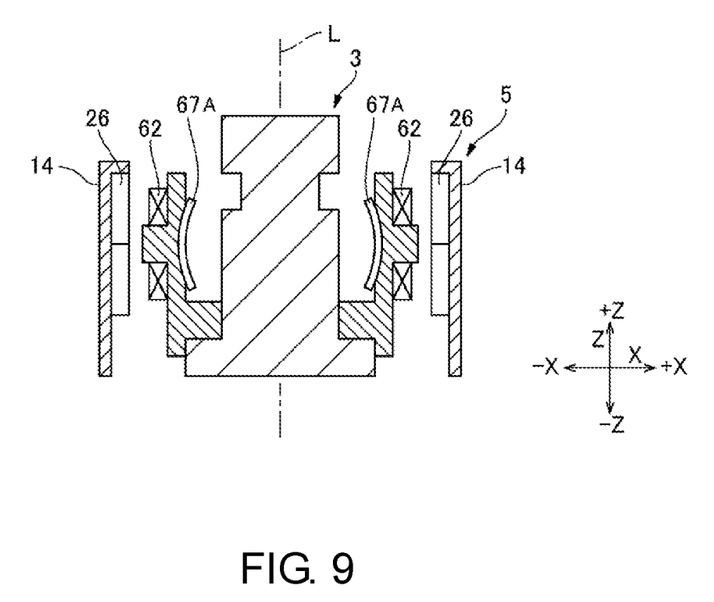
FIG. 9 is an explanatory view showing a magnetic member in a modified embodiment of the disclosure.

Further, as shown in FIG. 9, the magnetic member 67 may be formed in a circular arc shape. FIG. 9 is an explanatory view showing a magnetic member 67A in a modified embodiment. In other words, a magnetic member 67A in the modified embodiment is curved in a direction coming close to the swing drive magnet 26 as coming close to the magnetizing polarized line 26a of the swing drive magnet 26 in the "Z"-axis direction (axial line "L" direction) in the reference posture. According to this structure, linearity of a magnetic attraction force "F" generated between the magnetic member 67A and the swing drive magnet 26 can be easily secured with respect to a tilt angle of the movable body 3 which is turned.

Further, in the embodiment described above, the swing drive coil 62 and the magnetic member 67 are fixed to the movable body 3, and the swing drive magnet 26 is fixed to the fixed body 5. However, it may be structured that the swing drive coil 62 and the magnetic member 67 are fixed to the fixed body 5 and the swing drive magnet 26 is fixed to the movable body 3. Also in this case, the magnetic member 67 is disposed at a position overlapping with the magnetizing polarized line 26a of the swing drive magnet 26 when a state that the movable body 3 is located in the reference posture is viewed in the radial direction.

While the description above refers to particular embodiments of the disclosure, it will be understood that many modifications may be made without departing from the spirit thereof. The accompanying claims are intended to cover such modifications as would fall within the true scope and spirit of the disclosure.

The presently disclosed embodiments are therefore to be considered in all respects as illustrative and not restrictive, the scope of the disclosure being indicated by the appended claims, rather than the foregoing description, and all changes which come within the meaning and range of equivalency of the claims are therefore intended to be embraced therein.

What is claimed is:

1. An optical unit with a shake correction function comprising:
    a movable body comprising an optical element;
    a swing support mechanism configured to swingably support the movable body between a reference posture where an axial line previously set and an optical axis of the optical element are coincided with each other and a tilted posture where the optical axis is tilted with respect to the axial line;
    a fixed body which supports the movable body through the swing support mechanism;
    a magnetic swing drive mechanism configured to swing the movable body; and
    a posture return mechanism configured to return the movable body to the reference posture;
    wherein the magnetic swing drive mechanism comprises a coil fixed to one of the movable body and the fixed body, and a magnet fixed to an other of the movable body and the fixed body;
    wherein the magnet is polarized and magnetized to have different magnetic poles in a direction of the axial line;
    wherein the posture return mechanism comprises the magnet and a magnetic member which is attached to the one of the movable body and the fixed body to which the coil is fixed; and
    wherein a center of the magnetic member is overlapped with a magnetizing polarized line of the magnet when the movable body in the reference posture is viewed in a radial direction perpendicular to the axial line,
    the one of the movable body and the fixed body to which the coil is fixed comprises a fixed region to which the magnetic member is to be fixed, and
    a fixed position of the magnetic member is capable of being changed in the fixed region.

2. The optical unit with a shake correction function according to claim 1, wherein at least a part of the magnetic member is overlapped with the magnetizing polarized line when the movable body in the tilted posture is viewed in the radial direction.

3. The optical unit with a shake correction function according to claim 2, wherein a length of the magnetic member in the direction of the axial line is longer than a length of the magnetic member in a circumferential direction around the axial line.

4. The optical unit with a shake correction function according to claim 2, wherein a length of the magnetic member in the direction of the axial line is shorter than a length of the magnetic member a circumferential direction around the axial line.

5. The optical unit with a shake correction function according to claim 1, wherein the magnetic member is disposed on an opposite side to the magnet with the coil interposed therebetween in the radial direction.

6. The optical unit with a shake correction function according to claim 5, wherein at least a part of the magnetic member is overlapped with the magnetizing polarized line when the movable body in the tilted posture is viewed in the radial direction.

7. The optical unit with a shake correction function according to claim 1, wherein
the magnetic swing drive mechanism comprises a Hall element which is attached to the one of the movable body and the fixed body to which the coil is fixed,
the Hall element is disposed between the magnet and the magnetic member in the radial direction, and
the Hall element is overlapped with the magnetizing polarized line when the movable body in the reference posture is viewed in the radial direction.

8. The optical unit with a shake correction function according to claim 1, wherein
the coil and the magnetic member are fixed to the movable body, and
the magnet is fixed to the fixed body.

9. The optical nit with a shake correction function according to claim 8, wherein at least a part of the magnetic member is overlapped with the magnetizing polarized line when the movable body in the tilted posture is viewed in the radial direction.

10. The optical unit with a shake correction function according to claim 9, wherein a length in the direction of the axial line of the magnetic member is longer than a length of the magnetic member in a circumferential direction around the axial line.

11. The optical unit with a shake correction function according to claim 9, wherein the magnetic member is disposed on an opposite side to the magnet with the coil interposed therebetween in the radial direction.

12. The optical unit with a shake correction function according to claim 11, wherein
the movable body comprises a fixed region to which the magnetic member is to be fixed, and
a fixed position of the magnetic member is capable of being changed in the fixed region.

13. The optical nit with a shake correction function according to claim 11, wherein
the magnetic swing drive mechanism comprises a Hall element which is attached to the movable body,
the Hall element is disposed between the magnet and the magnetic member in the radial direction, and
the Hall element is overlapped with the magnetizing polarized line when the movable body in the reference posture is viewed in the radial direction.

14. The optical unit with a shake correction function according to claim 1, wherein
the magnetic swing drive mechanism comprises a pair of the magnetic swing drive mechanisms which are disposed on both sides with the axial line interposed therebetween,
the posture return mechanism comprises two magnetic members as the magnetic member each of which is attached to the one of the movable body and the fixed body to which the coil of each of the pair of the magnetic swing drive mechanisms is fixed, and
each of the two magnetic members is arranged so that a center of the magnetic member is overlapped with a magnetizing polarized line of each of the magnets of the pair of the magnetic swing drive mechanisms when the movable body in the reference posture is viewed in the radial direction perpendicular to the axial line.

15. The optical unit with a shake correction function according to claim 14, wherein
the coils and the magnetic members are fixed to the movable body, and
the magnets are fixed to the fixed body.

16. The optical unit with a shake correction function according to claim 15, wherein each of the magnetic members is disposed on an opposite side to each of the magnets with each of the coils interposed therebetween in the radial direction.

17. The optical unit with a shake correction function according to claim 16, wherein
the movable body comprises a fixed region to which each of the magnetic members is to be fixed, and
a fixed position of each of the magnetic members is capable of being changed in the fixed region.

18. The optical unit with a shake correction function according to claim 16, wherein
the magnetic swing drive mechanism comprises a Hall element which is attached to the movable body,
the Hall element is disposed between one of the magnets and the magnetic member facing the one of the magnets in the radial direction, and
the Hall element is overlapped with the magnetizing polarized line of the one of the magnets when the movable body in the reference posture is viewed in the radial direction.

19. The optical unit with a shake correction function according to claim 1, further comprising a second magnetic swing drive mechanism configured to swing the movable body in a direction different from that of the magnetic swing drive mechanism,
wherein the second magnetic swing drive mechanism comprises a second coil, which is fixed to one of the movable body and the fixed body, and a second magnet fixed to the other of the movable body and the fixed body;
wherein the second magnet is polarized and magnetized to have different magnetic poles in a direction of the axial line;
wherein the posture return mechanism comprises a second magnetic member which is attached to the one of the movable body and the fixed body to which the second coil is fixed; and
wherein a center of the second magnetic member is overlapped with a second magnetizing polarized line of the second magnet when the movable body in the reference posture is viewed in a radial direction.

20. The optical unit with a shake correction function according to claim 19, wherein
the coil, the second coil, the magnetic member and the second magnetic member are fixed to the movable body, and
the magnet and the second magnet are fixed to the fixed body.

* * * * *